(12) United States Patent
Fett et al.

(10) Patent No.: US 7,087,841 B2
(45) Date of Patent: Aug. 8, 2006

(54) COMMUNICATION CABLE AND METHOD OF INSTALLING SAME

(75) Inventors: Dieter Fett, Bavaria (DE); Olaf Grosskurth, Bavaria (DE); Georg Josef Koebler, Grossaitingen (DE); Jason Pedder, Bavaria (DE); Elmar Staudinger, Augsburg (DE)

(73) Assignee: Fitel USA Corp., Norcross, GA (US)

( * ) Notice: Subject to any disclaimer, the term of this patent is extended or adjusted under 35 U.S.C. 154(b) by 214 days.

(21) Appl. No.: 10/095,651

(22) Filed: Mar. 12, 2002

(65) Prior Publication Data
US 2002/0129967 A1 Sep. 19, 2002

(30) Foreign Application Priority Data
Mar. 13, 2001 (EP) .................................. 01302310

(51) Int. Cl.
*H01B 7/00* (2006.01)
*H01B 7/36* (2006.01)

(52) U.S. Cl. .................................. 174/110 R; 174/112

(58) Field of Classification Search ................ 174/97, 174/99 R, 110 R, 110 PM, 112, 113 R, 113 AS, 174/120 R, 120 SR, 102 SP; 254/134.4
See application file for complete search history.

(56) References Cited

U.S. PATENT DOCUMENTS

| | | | | |
|---|---|---|---|---|
| 2,583,025 A * | 1/1952 | Swift et al. | ............. | 174/117 R |
| 2,583,026 A * | 1/1952 | Swift | ..................... | 174/117 R |
| 4,856,760 A * | 8/1989 | Frost et al. | ............... | 254/134.4 |
| 4,892,442 A * | 1/1990 | Shoffner | .................. | 405/183.5 |
| 5,022,634 A * | 6/1991 | Keeble | .................... | 254/134.4 |
| 5,211,377 A * | 5/1993 | Griffioen et al. | ......... | 254/134.4 |
| 5,238,328 A * | 8/1993 | Adams et al. | ............ | 405/183.5 |
| 5,308,041 A * | 5/1994 | Griffioen et al. | ......... | 254/134.4 |
| 5,324,557 A * | 6/1994 | Lupke | ........................ | 428/36.5 |
| 5,713,700 A * | 2/1998 | Vogelsang | ............... | 405/183.5 |
| 5,990,419 A * | 11/1999 | Bogese | ..................... | 174/120 R |
| 6,170,804 B1 * | 1/2001 | Allen | ........................ | 254/134.4 |
| 2002/0100604 A1 * | 8/2002 | Spruell et al. | | |

FOREIGN PATENT DOCUMENTS

| | | | | |
|---|---|---|---|---|
| DE | 23 55 041 A | * | 1/1776 | |
| DE | 42 02 147 A | * | 7/1993 | |
| FR | 2 660 790 | | 4/1990 | |
| FR | 2 660 790 A | * | 10/1991 | |

* cited by examiner

Primary Examiner—William H. Mayo, III

(57) ABSTRACT

A communication cable for being used in ducts or tubes comprising an outer jacket (1) which is formed with ribs (4) spaced around the periphery of the jacket and extending along the length of the cable. The new profiled cable has a lower index of friction when being installed in the ducts or tubes.

12 Claims, 4 Drawing Sheets

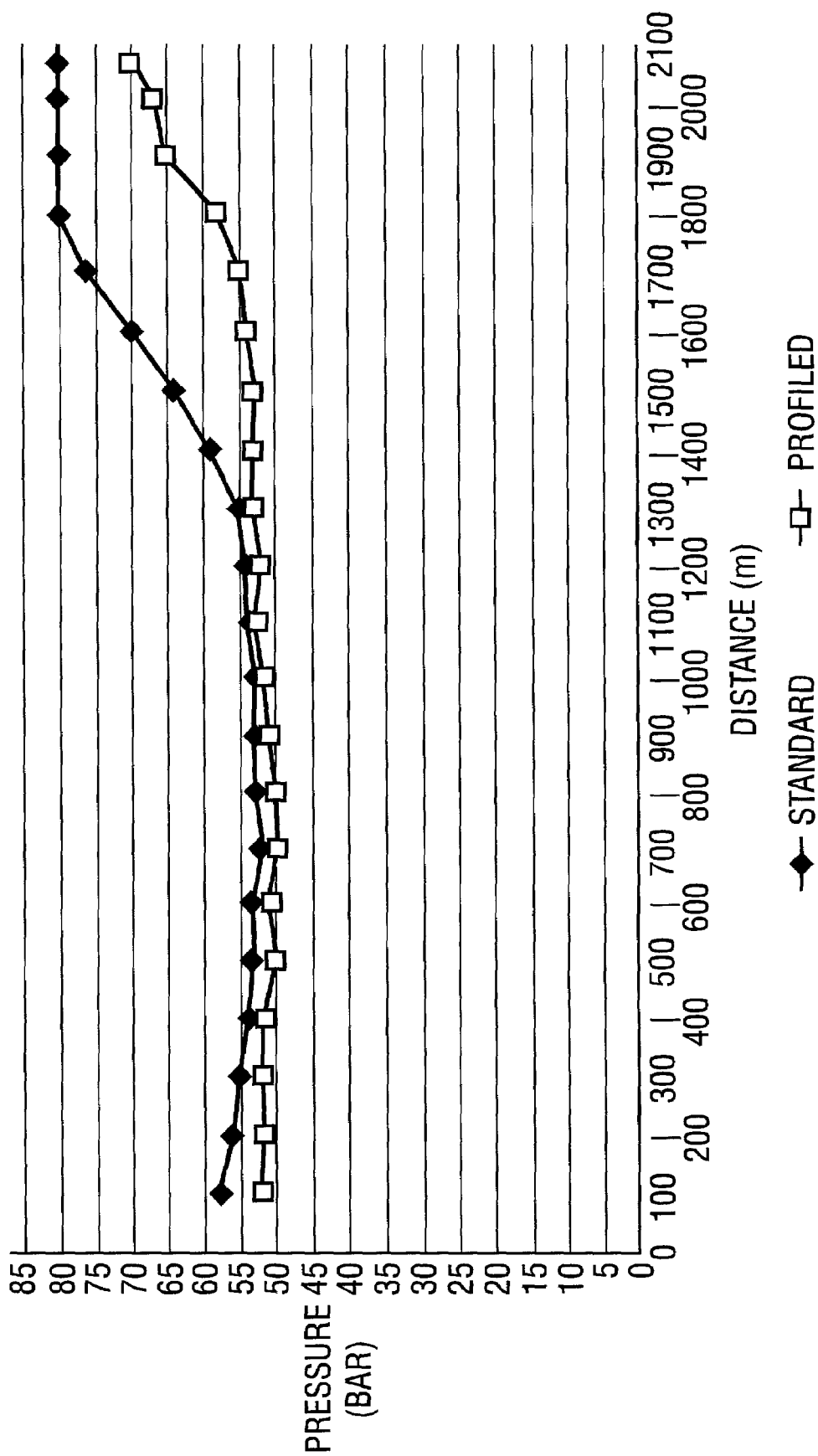

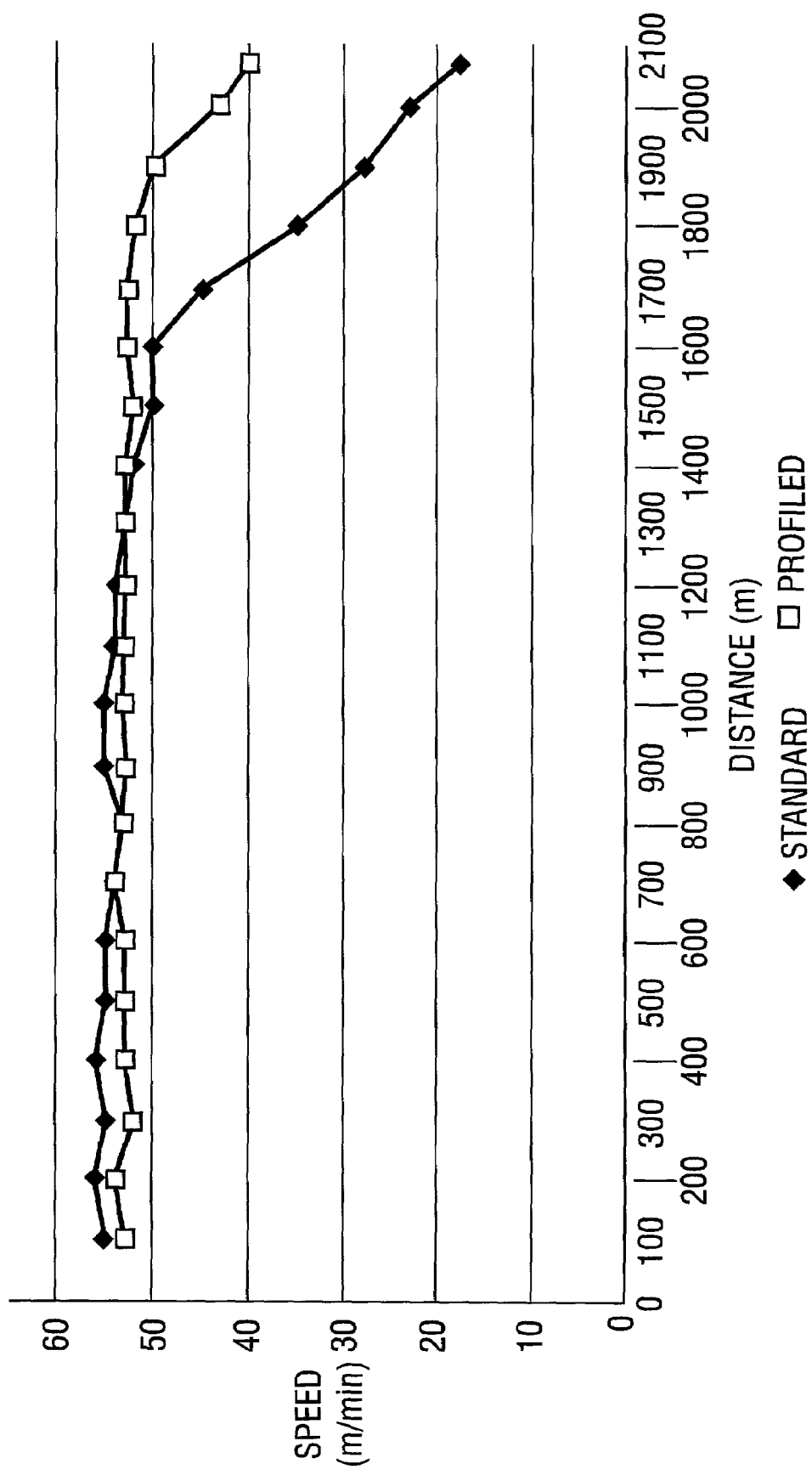
FIG. 3 DISTANCE VERSUS SPEED

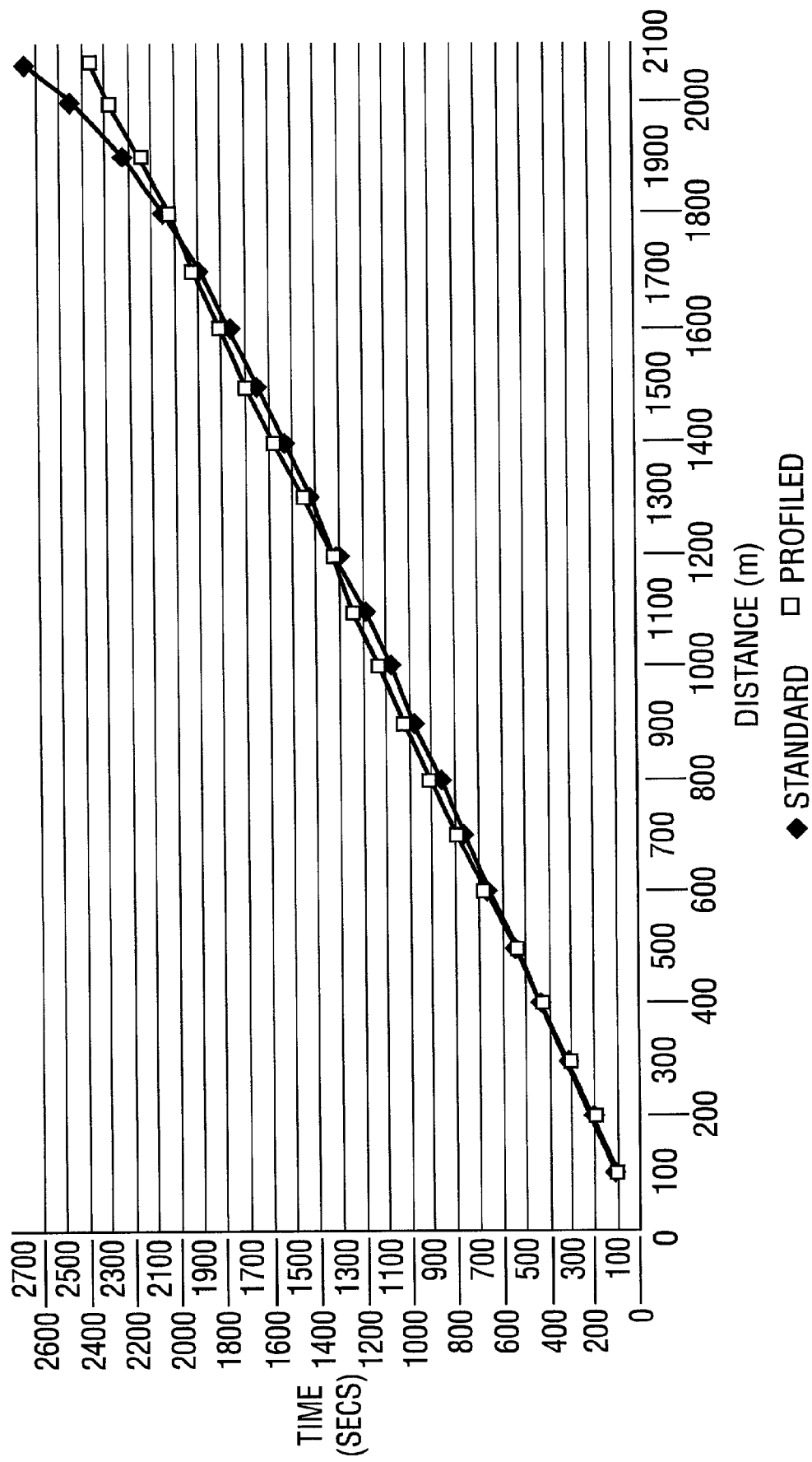
FIG. 4 DISTANCE VERSUS TIME

COMMUNICATION CABLE AND METHOD OF INSTALLING SAME

CROSS REFERENCE TO RELATED APPLICATION

This application claims priority of European Application No. 01302310.6 filed on Mar. 13, 2001.

FIELD OF THE INVENTION

The invention relates to a cable for being used in ducts or tubes comprising an inner core of signal transmitting means and an outer jacket of protective material covering the signal transmitting means, and to a method of installing such cables in ducts or tubes. The term "cable" is intended to include also a single fiber unit covered by a jacket, or a bundle of fibers defining a profile outline.

BACKGROUND OF THE INVENTION

Communication cables are often installed in ducts or empty tubes provided to lead the communication cable on difficult installation routes having bends or changes in direction. Several methods are in use to install the cable, among them installation using a pushing force and compressed air which drags the cable along the duct. The method is limited by the friction between cable and inner wall of the duct, and the pushing force. Depending on parameters of the duct and the cable a maximum force exists which can be used for advancing the cable. When such maximum force is exceeded, the cable may buckle and stall.

SUMMARY OF THE INVENTION

It is an object of the invention to create a cable which shows lower friction when being installed in ducts or tubes.

It is a further object of the present invention to improve on parameters of the cable to be installed using compressed air.

According to the invention, the outer jacket of the cable is formed with ribs which are spaced around the periphery of the jacket and extend along the length of the cable.

The invention also proposes a method of installing cables in ducts or tubes wherein a cable is used having ribs which extend along the cable. One end of the ribbed cable is introduced in the duct and fed forward. Simultaneously, compressed air is admitted into the duct and flows along the length of the ribbed cable. This has a dragging effect on the cable. The effect is increased by the fact that the surface of the cable is increased by the ribs. Furthermore, the flowing air finds flow channels between the ribs and adjacent inner walls of the ducts, and since the lower channels are narrower than the upper channels, pressure in the lower channels is higher than in the upper channels where the velocity of the flowing air is higher than in the lower channels. This makes a lifting effect onto the cable thus decreasing the pressure of the contact surfaces between the cable and the lower duct walls. Decreasing contact pressure means lowering the friction between cable and duct wall.

The invention allows to reduce the installation time (time reduction of approximately 10 per cent or more). Furthermore, installation can be carried out for longer distances (approximately 20 to 30 per cent or more) due to the fact that the feed forward force and air pressure remain stable at lower levels for greater distances.

BRIEF DESCRIPTION OF THE DRAWINGS

FIG. 2 is a diagram "distance versus pushing force" for a standard cable and a novel cable, FIG. 3 is a diagram "distance versus speed" and FIG. 4 is a diagram "distance versus time".

DETAILED DESCRIPTION

Figure 1:
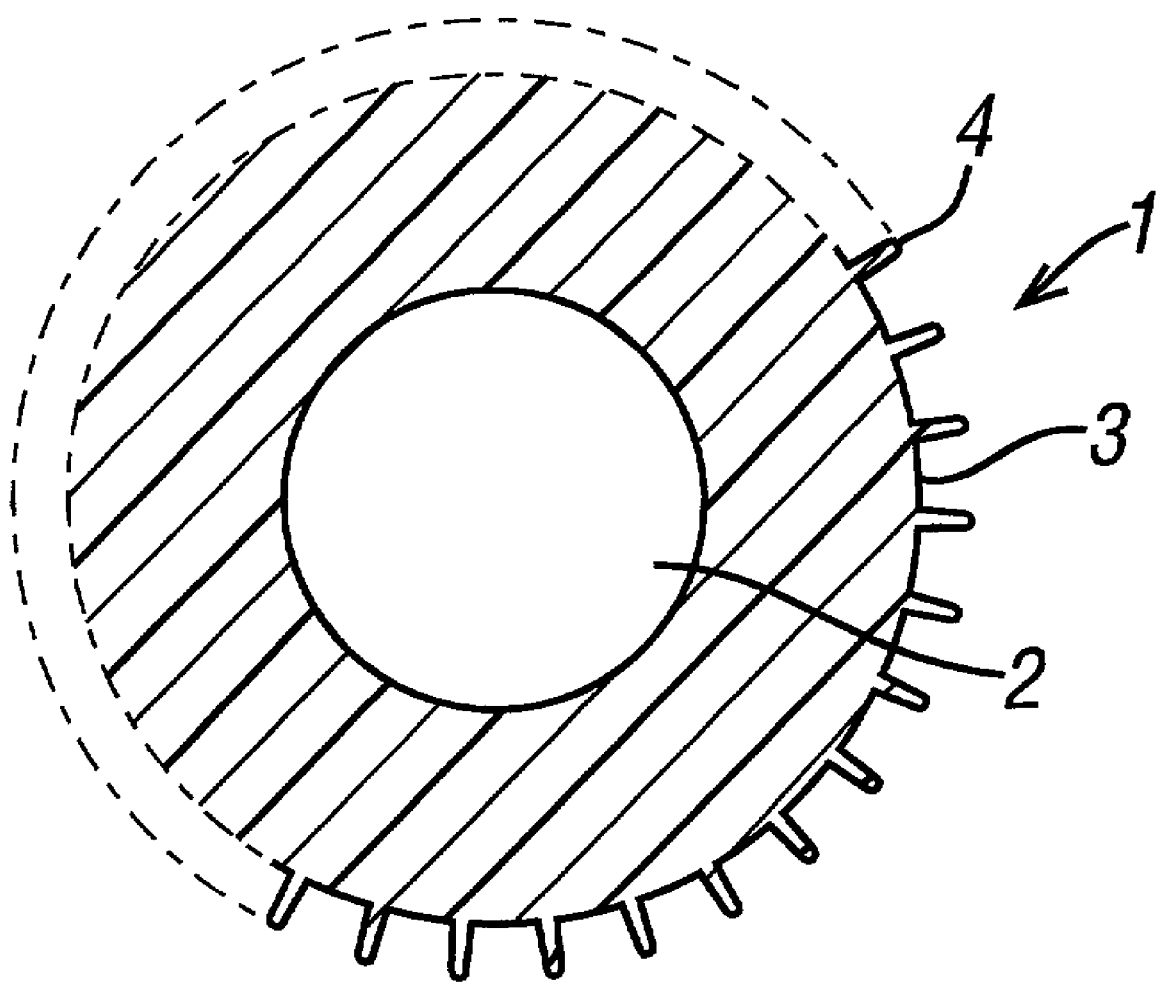
FIG. 1 is a cross-section through the sheath or jacket of a communication cable according to invention.

FIG. 1 shows an enlarged cross-section through the sheath or jacket of a communication cable according to invention. The jacket 1 has an inner space 2 extending along its length which accommodates the inner core (not shown) of the cable, generally optical fibers alone or in combination with conductors which can transmit signals. The core may include only one optical fiber. The outer jacket 1 may include several layers of different protective materials, for example corrugated steel tape for rodent protection, as is known in the art. The outer layer of the jacket is preferably polyethylene. Such material has a general low index of friction and can be applied upon the cable core using standard extrusion methods.

The jacket has an outer periphery 3 which is profiled, that is, it shows webs or ribs 4. Each rib 4 has an inner root end and an outer ridge end which is preferably rounded. As shown, the ribs converge from the root end to the ridge end. Furthermore, the ribs 4 are evenly distributed around the periphery 3 of the jacket 1. The distances between adjacent ribs 4 are preferably larger than the thickness of the ribs at the root end. Each cm length in circumference of the cable may carry fife to twenty ribs. The height of the ribs 4 may vary in a range from 0.1 to 2 mm. Cables of the kind described may have an outer diameter in the range of 1 to 30 mm and preferably between 5 and 20 mm. Dependent on the diameter of the cable, the jacket may include 15 to 90 ribs.

A conventional cable has a smooth surface without any ribs so that the contact area with the inner duct wall in case of a standard cable is larger than in case of a novel cable of invention. On the other hand, the ribbed cable of invention has an increased contact pressure at reduced contact surfaces. It is known that friction depends from the contact area and the contact pressure. There is no general rule which factor prevails. However, the inventors have shown that the novel cable can be installed with lower friction on the inner walls of the ducts than with conventional cables. This is proved by the several diagrams of FIGS. 2 through 4. Tests were made with a standard cable having an outer diameter of 12.2 mm and the new cable having the same outer diameter plus ribs having a height of 0.5 mm. The inner diameter of the test ducts or tubes for guiding the cables was 20 mm. The test ducts had bends, above all in a distance between 1500 and 2100 m. A cable driving apparatus was used which had a hydraulic controller for the motor so that the cable driving force could be determined in terms of hydraulic pressure delivered to the hydraulic motor. Simultaneously, air pressure of 10 to 14 bar was introduced into the duct. The driving force was controlled so that the cable speed, when possible, was in the range between 50 and 60 m/min, however, without attaining a value at which the cable may buckle and stall.

FIG. 2 shows a graph of distance versus pushing force (measured in hydraulic pressure for the standard cable and the new, profiled cable. Until a length of 1300 m, the standard and the profiled cables do not differ essentially; for the distance between 1300 and 1800 m, the pressure needed for advancing the standard cable climbed up to 80 bar, whereas with the new profiled cable pressure remained essentially constant. Only for the distance between 1800 and 2100 m, the pressure needed climbed up until 70 bar, whereas with the standard cable the maximum available pressure of 80 bar was reached.

FIG. 3 shows the speed of advancing the standard cable and the new profiled cable, respectively. For a length of 1600 m, the speed that could be reached with the standard cable and with the new profiled cable was essentially the same. For the distance between 1600 and 2100 m, the maximum speed of the standard cable diminished from 50 m/min to less than 20 m/min, whereas with the new profiled cable, the drop in maximum speed was only to 40 m/min.

FIG. 4 shows the best time needed for installing a standard cable and a new, profiled cable for a length of 2100 m. As shown, time savings can be made on bigger installation lengths and/or with heavier bends.

With invention, communication cables in the range of 1 to 30 mm outer diameter, and preferably in the range of 5 to 20 mm outer diameter are considered to be installed—as single cables or in combination with other cables—in ducts or tubes having an inner diameter, in the range of 2 to 50 mm.

The invention claimed is:

1. A cable for being used in ducts or tubes, comprising:
   an inner core of signal transmitting means, and an outer jacket (1) of protective material covering the signal transmitting means,
   characterized in that
   the outer jacket (1) is formed with ribs (4) which are spaced around the periphery of the jacket (1) and extend along the length of the cable, wherein each rib (4), seen in cross-section, has a first end connected to the jacket (1) and a second, free end somewhat rounded, each rib tapering in that width of the rib reduces from the first end to the second end.

2. The cable according to claim 1, wherein the ribs have a height in the range between 0.1 to 2 mm.

3. The cable according to claim 1, wherein the number of the ribs along the periphery of the jacket is between 5 to 20 per cm circumference length.

4. The cable according to claim 1, wherein the outer diameter of the cable is in a range between 1 and 30 mm.

5. The cable according to claim 4, wherein the range is between 5 and 20 mm.

6. The cable according to claim 1, wherein said outer jacket (1) comprises several layers of materials, said ribs (4) being provided on the outermost layer.

7. The cable according to claim 6, wherein the material of at least the outermost layer is polyethylene (PE).

8. The cable according to claim 1, wherein said outermost layer of said jacket (1) is an extruded layer having a wall thickness in the range between 0.15 to 2 mm.

9. A method of installing cables in ducts or tubes,
   (a) providing the cable with ribs (4) extending along the cable;
   (b) introducing one end of the ribbed cable in a duct or tube and applying a pushing force onto the cable, the cable comprising an inner core of signal transmitting means, and an outer jacket (1) of protective material covering the signal transmitting means, the outer jacket (1) being formed with ribs (4) which are spread around the periphery of the jacket (1) and extend along the length of the cable, wherein each rib (4), seen in cross-section, has a first end connected to the jacket (1) and a second, free end somewhat rounded, each rib tapering in that width of the rib reduces from the first end to the second end;
   (c) admitting compressed air into the duct or tube so as to flow along the ribbed cable so far introduced, and dragging the ribbed cable by the flowing air which finds flow channels between ribs (4) so that the ribbed cable is lifted somewhat and friction between the free rib ends and the inner wall of the duct or tube is reduced.

10. The method of claim 9 wherein the pushing force for advancing the cable is controlled so that the cable speed is on a desired value, and also to remain below the force when the cable may buckle and stall.

11. The method of claim 9 wherein the speed of the ribbed cable is in a range between 20 and 65 m/min for a length up to 3500 m.

12. The method of claim 9 wherein the time for installing a ribbed cable of 2000 m length is in a range of between 30 to 45 min.

* * * * *